(12) United States Patent
Sugiyama et al.

(10) Patent No.: US 7,172,821 B2
(45) Date of Patent: Feb. 6, 2007

(54) COATING MATERIAL HAVING CORROSION RESISTANCE AND WEAR RESISTANCE

(75) Inventors: Kenichi Sugiyama, Fujisawa (JP);
Satoshi Kawamura, Fujisawa (JP);
Shuhei Nakahama, Tokyo (JP);
Hirokazu Takayama, Tokyo (JP);
Matsuho Miyasaka, Fujisawa (JP)

(73) Assignee: Ebara Corporation, Tokyo (JP)

( * ) Notice: Subject to any disclaimer, the term of this patent is extended or adjusted under 35 U.S.C. 154(b) by 119 days.

(21) Appl. No.: 10/372,250

(22) Filed: Feb. 25, 2003

(65) Prior Publication Data

US 2003/0203233 A1 Oct. 30, 2003

(30) Foreign Application Priority Data

Feb. 25, 2002 (JP) .............................. 2002-047628

(51) Int. Cl.
*B32B 15/04* (2006.01)
(52) U.S. Cl. ............... 428/628; 428/627; 428/678; 428/680
(58) Field of Classification Search ............... 428/685, 428/667, 628, 627, 564, 565, 621, 680, 678
See application file for complete search history.

(56) References Cited

U.S. PATENT DOCUMENTS 3,829,260 A * 8/1974 Shimoda .................... 418/178

4,173,685 A * 11/1979 Weatherly ................... 428/556
4,325,994 A 4/1982 Kitashima et al.
6,001,492 A * 12/1999 Jackson et al. ............. 428/610
6,060,174 A * 5/2000 Sabol et al. ................ 428/610
6,399,216 B1 * 6/2002 Jayaweera et al. .......... 428/610
6,780,458 B2 * 8/2004 Seth et al. .................. 427/201

FOREIGN PATENT DOCUMENTS

JP 7-151097 6/1995
JP 2001-82479 3/2001

OTHER PUBLICATIONS

T. Rogne, et al. "Effect of Metallic Matrix Composition on the Erosion-Corrosion Behavior of WC-Coatings," Thermal Spray: A United Forum for Scientific and Tehcnological Advances, C.C. Berndt (Ed.), 1997, pp. 113-119.

* cited by examiner

Primary Examiner—Jennifer C. McNeil
Assistant Examiner—G. Blackwell
(74) Attorney, Agent, or Firm—Oblon, Spivak, McClelland, Maier & Neustadt, P.C.

(57) ABSTRACT

A coating material has a first layer deposited on a base material and a second layer deposited on the first layer. The first layer is made of a Ni-base alloy or a Co-base alloy containing carbon as an unavoidable impurity. The second layer is made of a hard material containing carbide and a metal component. The first layer serves as a barrier for preventing carbon from being diffused from the second layer into the base material to prevent the base material from being carburized.

7 Claims, 2 Drawing Sheets

COATING MATERIAL HAVING CORROSION RESISTANCE AND WEAR RESISTANCE

BACKGROUND OF THE INVENTION

1. Field of the Invention

The present invention relates to a pump or other equipment for use in a corrosive environment such as seawater or chemical substances, and more particularly to a coating material having corrosion resistance and wear resistance suitable for use on parts of a pump that is designed to operate under conditions of seawater mixed with earth and sand or conditions of generating cavitation, a method of manufacturing such coating material having corrosion resistance and wear resistance, and a pump having parts coated with such coating material.

2. Description of the Related Art

Pumps that are designed to operate in a corrosive environment such as seawater or chemical substances have major structural parts such as a casing and an impeller which are held in contact with the liquid handled by the pumps. In this case, such major structural parts are mostly made of stainless steel which is highly resistant to corrosion and relatively inexpensive. However, sliding parts such as a liner ring portion and a bearing portion, and an impeller inlet and an outer peripheral portion of an impeller having a high peripheral speed in the case where the liquid being handled is mixed with solid substances such as earth and sand, and scales, need to be made of a material which is more resistant to wear and erosion than the stainless steel. Such a material is further required to have corrosion resistance equivalent to or higher than the stainless steel in view of the environment in which the pumps are used.

It has heretofore been customary to coat local surface areas with corrosion-resistant hard materials for making the local surface areas resistant to wear, cavitation, and corrosion, and many hard coating materials have heretofore achieved satisfactory results in many cases. Typical hard materials include a Co-base alloy (e.g., an alloy under the tradename of STELLITE), a Ni-base alloy (e.g., an alloy under the tradename of COLMONOY).

These hard coating materials have a hardening function by carbide which is contained in advance in the coating materials and/or carbide which is precipitated in the coating when the hard coating materials are applied. Therefore, it is necessary that the hard coating materials contain carbon.

When these coating materials are applied for forming a coating layer on a base material, carbon is unavoidably diffused from the coating layer into the base material. Therefore, a portion of the base material which is held in contact with the coating layer becomes sensitive and has its corrosion resistance greatly reduced. If the product is used for a long period of time as it is, then corrosion starts developing from the portion of the base material which is held in contact with the coating layer, resulting in separation of the coating layer from the base material.

In order to prevent the product from suffering such corrosive damage, it is necessary to keep the boundary between the coating layer and the base material from being exposed. It has been the conventional practice to employ either a structural design to avoid any exposure of the boundary between the coating layer and the base material or a means for covering an exposed boundary between the coating layer and the base material. However, these attempts suffer technological difficulty and economical disadvantages, and lack long-term reliability.

As described above, hard coating materials such as a Co-base alloy and a Ni-base alloy need to contain carbon for producing hardness. When a hard material is deposited as a coating layer on a base material, carbon is unavoidably diffused from the coating layer into the base material. As a result, a portion of the base material which is held in contact with the coating layer becomes sensitive during a cooling process after the coating material is deposited. Specifically, Cr-carbide is precipitated in the grain boundaries, thus lowering the Cr concentration near the grain boundaries. Therefore, the portion of the base material which is held in contact with the coating layer becomes lower in corrosion resistance than the base material itself. If the product is used for a long period of time as it is, then corrosion starts developing from the portion of the base material which is held in contact with the coating layer.

FIG. 4 of the accompanying drawings shows in fragmentary cross section a conventional hard material such as a Co-base alloy or a Ni-base alloy (e.g., an alloy under the tradename of STELLITE or an alloy under the tradename of COLMONOY) which is deposited, by way of overlaying, as a coating layer 1 on a base material 2. In FIG. 4, Cr-carbide 4 is precipitated in the grain boundaries in a portion of the base material 2 which is held in contact with the coating layer 1. When the base material 2 having the coating layer 1 thereon is left exposed to an ambient environment for a long period of time, a sensitized layer 3 is formed in the surface layer of the base material 2, causing the sensitized layer 3 to be corroded locally and causing the coating layer 1 to be separated finally.

SUMMARY OF THE INVENTION

It is therefore an object of the present invention to provide a coating material having corrosion resistance and wear resistance suitable for use on parts of a pump that is designed to operate in a corrosive environment such as seawater or chemical substances, particularly, under conditions of seawater mixed with earth and sand or conditions of generating cavitation, a method of manufacturing such coating material having corrosion resistance and wear resistance, and a pump having parts coated with such coating material.

In order to achieve the above object, according to a first aspect of the present invention, there is provided a coating material comprising: a first layer adapted to be deposited on a base material, the first layer being made of a Ni-base alloy or a Co-base alloy containing carbon as an unavoidable impurity; and a second layer deposited on the first layer, the second layer being made of a hard material containing carbide and a metal component, the first layer serving as a barrier for preventing carbon from being diffused from the second layer into the base material to prevent the base material from being carburized.

In a preferred aspect of the present invention, the carbide gives a hardness to the second layer.

In a preferred aspect of the present invention, the metal component gives corrosion resistance to the second layer.

In a preferred aspect of the present invention, the first layer is made of a Ni—Cr—Mo alloy containing Cr, Mo, at least one of Si and B, and a remainder that consists of Ni and unavoidable impurities.

In a preferred aspect of the present invention, the Ni—Cr—Mo alloy prevents the base material from being carburized when the first layer is deposited on the base material.

In a preferred aspect of the present invention, the first layer is made of a Co—Cr—Mo alloy containing Cr, Mo, at least one of Si and B, and a remainder that consists of Co and unavoidable impurities.

In a preferred aspect of the present invention, the Co—Cr—Mo alloy prevents the base material from being carburized when the first layer is deposited on the base material.

In a preferred aspect of the present invention, the second layer is made of a Co-base alloy or a Ni-base alloy.

In a preferred aspect of the present invention, the Co-base alloys or the Ni-base alloy has a function for giving a hardness to the second layer by carbide which is contained in advance in the coating material, carbide which is newly precipitated after carbide which is contained in advance in the coating material is melted with another constituent of the coating material when the second layer is deposited on the first layer, or carbide which is precipitated in the second layer when the second layer is deposited on the first layer.

According to a second aspect of the present invention, there is provided a pump component, comprising: a pump part coated with a coating material, said coating material comprising: a first layer adapted to be deposited on a base material, said first layer being made of a Ni-base alloy or a Co-base alloy containing carbon as an unavoidable impurity; and a second layer deposited on said first layer, said second layer being made of a hard material containing carbide and a metal component, said first layer serving as a barrier for preventing carbon from being diffused from said second layer into the base material to prevent the base material from being carburized.

According to a third aspect of the present invention, there is provided a method of manufacturing a coating material, comprising: depositing a first layer on a base material, the first layer being made of a Ni-base alloy or a Co-base alloy containing carbon as an unavoidable impurity; and depositing a second layer on the first layer, the second layer being made of a hard material containing carbide and a metal component, the first layer serving as a barrier for preventing carbon from being diffused from the second layer into the base material to prevent the base material from being carburized.

In a preferred aspect of the present invention, the first layer is deposited by way of overlaying, using a powder or a welding rod of the Ni-base alloy or the Co-base alloy, and the second layer is deposited by a self-fluxing alloy spraying process for thermal-spraying a powder of the hard material or applying a mixture of a powder of the hard material and an organic binder, and thereafter melting the hard material with heat.

In a preferred aspect of the present invention, the first layer is deposited by a self-fluxing alloy spraying process for thermal-spraying a powder of the Ni-base alloy or the Co-base alloy, or applying a mixture of a powder of the Ni-base alloy or the Co-base alloy and an organic binder, and thereafter melting the Ni-base alloy or the Co-base alloy with heat, and the second layer is deposited by a self fluxing alloy spraying process for thermal-spraying a powder of the hard material, or applying a mixture of a powder of the hard material and an organic binder, and thereafter melting the hard material with heat.

The second layer is made of a Co-base alloy or a Ni-base alloy which has a function for giving a hardness to the second layer by carbide which is contained in advance in the coating material or carbide which is precipitated in the second layer when the second layer is deposited on the first layer.

The first layer needs to be deposited on the base material such that no minute voids responsible for crevice corrosion are formed in the boundary between the first layer and the base material and within the first layer. The first layer may be deposited by way of overlaying, using a powder of its material according to a plasma transferred arc welding process, by way of overlaying, using a welding rod of its material according to a TIG (Tungsten Inert Gas) welding process, or by way of a self-fluxing alloy spraying process for thermal-spraying a powder of its material or applying a mixture of a powder of its material and an organic binder, and thereafter melting its material with heat. The second layer may be deposited according to a process that is generally used to deposit an ordinary hard material, or may be deposited according to an overlaying process or a self-fluxing alloy spraying process.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENTS

Next, a coating material having corrosion resistance and wear resistance according to an embodiment of the present invention will be described with reference to FIGS. 1 through 3.

Figure 1:
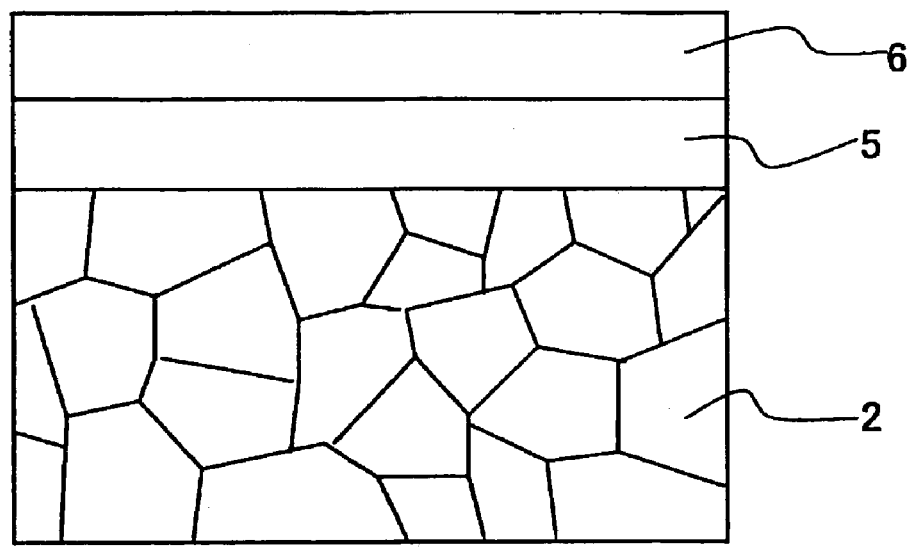
FIG. 1 is a fragmentary cross-sectional view of a base material having a hard coating material according to the present invention.

As shown in FIG. 1, a base material 2 has hard coating deposited thereon. The hard coating comprises a first layer 5 disposed on the base material 2 and a second layer 6 disposed on the first layer 5. The first layer 5 is made of a Ni—Cr—Mo alloy or a Co—Cr—Mo alloy which is resistant to crevice corrosion. The Ni—Cr—Mo alloy comprises an alloy containing Cr, Mo, at least one of Si and B, and a remainder that consists of Ni and unavoidable impurities. The Co—Cr—Mo alloy comprises an alloy containing Cr, Mo, at least one of Si and B, and a remainder that consists of Co and unavoidable impurities. The second layer 6 comprises a layer of hard material deposited on the first layer 5 by way of overlaying. The second layer 6 is made of a Co-base alloy or a Ni-base alloy which has a function for giving a hardness to the second layer by carbide which is contained in advance in the coating material, carbide which is newly precipitated after carbide contained in advance in the coating material is melted with another constituent of the coating material when the second layer 6 is deposited, or carbide which is precipitated in the coating when the second layer 6 is deposited. Since the Ni—Cr—Mo alloy or the Co—Cr—Mo alloy of the first layer 5 contains carbon as an unavoidable impurity only, no carbon is diffused from the second layer 6 into the base material 2. In a portion of the base material 2 which is held in contact with the first layer 5, Cr-carbide is not precipitated in the grain boundaries unlike the conventional technology. Therefore, even when the product shown in FIG. 1 is exposed to a corrosive environment such as seawater for a long period of time, the portion of the base material 2 which is held in contact with the coating comprising the first layer 5 and the second layer 6 is not corroded.

When the second layer 6 is deposited on the first layer 5, carbon is diffused from the second layer 6 into the first layer 5. However, because the first layer 5 is made of a Ni—Cr—Mo alloy or a Co—Cr—Mo alloy, the first layer 5 does not produce sensitized areas which are less corrosion-resistant unlike the conventional technology.

It is known in the art that when a hard material is deposited on a base material, the hard material is usually diluted by the base material. If a hard material is directly deposited on an iron-base base material such as stainless steel, then the hard material is diluted by Fe contained in the base material and becomes less corrosion-resistant. According to the present invention, however, inasmuch as the first layer 5, which serves as a base material with respect to the second layer 6, is made of a Ni—Cr—Mo alloy or a Co—Cr—Mo alloy, the second layer 6 does not become less corrosion-resistant even if it is diluted by components of the first layer 5.

The surface of the hard material of the second layer 6 has its functions which remain unimpaired. Therefore, the second layer 6 has wear resistance and erosion resistance provided by the hard material itself. However, if the product is to be exposed to a severe environment such as an environment containing a high concentration of earth and sand or an environment with violent cavitations, then a plurality of layers of hard materials may be applied on the product, as is the case with general applications.

EXAMPLE 1

A cylindrical component made of austenitic stainless steel SUS304 and having an outside diameter of 62 mm, an inside diameter of 51 mm, and a length of 65 mm was produced. Then, the outer circumferential surface of the cylindrical component was coated with a first layer 5 having a thickness of 1.5 mm. The first layer 5 was formed from a powder of a Ni—Cr—Mo alloy containing 30% Cr, 10% Mo, 1% Si by weight, and a remainder that consists of Ni and unavoidable impurities, by a plasma transferred arc welding process. Then, a surface layer of the first layer 5 was machined off to an outside diameter of 64.4 mm.

Thereafter, the outer circumferential surface of the first layer 5 was coated with a second layer 6 having a thickness of 1.5 mm. The second layer 6 was formed from a powder of a hard material of a Co-base alloy (an alloy under the tradename of STELLITE 21 containing 26% Cr, 5.9% Mo, 3% Ni, 1.5% Fe, 1.1% Si, 0.25% C by weight, and a remainder that consists of Co) by a plasma transferred arc welding process. Then, a surface layer of the second layer 6 was removed by a machining process, and the bore and the length of the cylindrical component were finished, thus producing a cylindrical component having an outside diameter of 66.4 mm, an inside diameter of 53 mm, and a length of 63 mm, and having the first and second layers 5, 6 on its outer circumferential surface.

In Example 1, austenitic stainless steel SUS304 was used as the base material 2. However, the present invention is not limited to any base materials and may use various base materials insofar as they can be used in seawater. In Example 1, the first and second layers 5, 6 were formed by the plasma transferred arc welding process. However, the first and second layers 5, 6 may be formed by any processes insofar as they do not produce voids responsible for crevice corrosion in the boundary between the layer and the base material and within the layer. For example, it is possible to employ a self-fluxing alloy spraying process for thermal-spraying a powder of the layer material or coating a mixture of a powder of the layer material and an organic binder, and thereafter melting the layer material with heat. However, a plasma transferred arc welding process or a TIG welding process is preferable from the long-term reliability of the coated layers.

In Example 1, a Co-base alloy which is mainly composed of Co was used as the material of the second layer. However, the main constituent of the alloy for use as the material of the second layer is not limited to Co, but may be any of various materials that are corrosion-resistant in seawater. For example, the main constituent of the alloy for use as the material of the second layer may be Ni which has corrosion resistance equivalent to Co.

Figure 2:
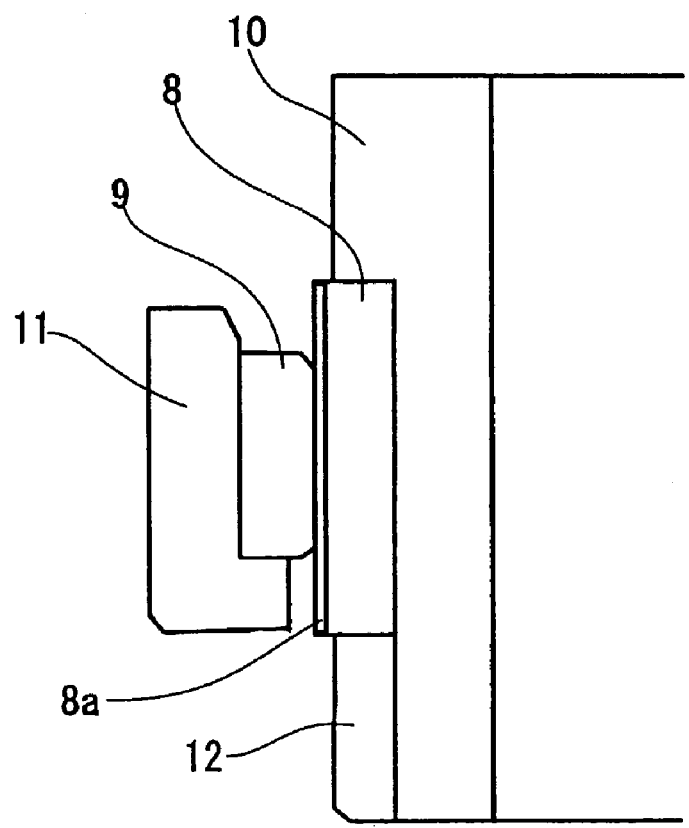
FIG. 2 is a fragmentary cross-sectional view of a bearing device which incorporates the hard coating material according to the present invention.

FIG. 2 shows in fragmentary cross section a bearing device which comprises the cylindrical component according to Example 1 serving as a bearing sleeve, and a SiC bearing combined therewith. Specifically, as shown in FIG. 2, the bearing device includes a cylindrical shaft sleeve 10, a bearing sleeve 8 comprising the cylindrical component according to Example 1 and having an outer circumferential layer 8a as the two-layer coating of Example 1, and a bearing 9 fixed to a bearing casing 11.

EXAMPLE 2

Figure 3:
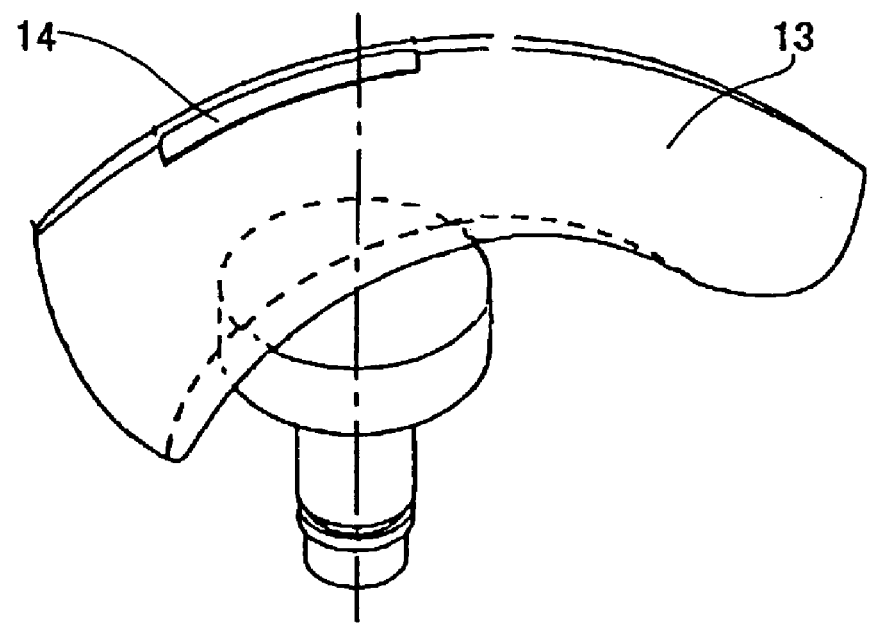
FIG. 3 is a perspective view of a movable vane which incorporates the hard coating material according to the present invention.
Figure 4:
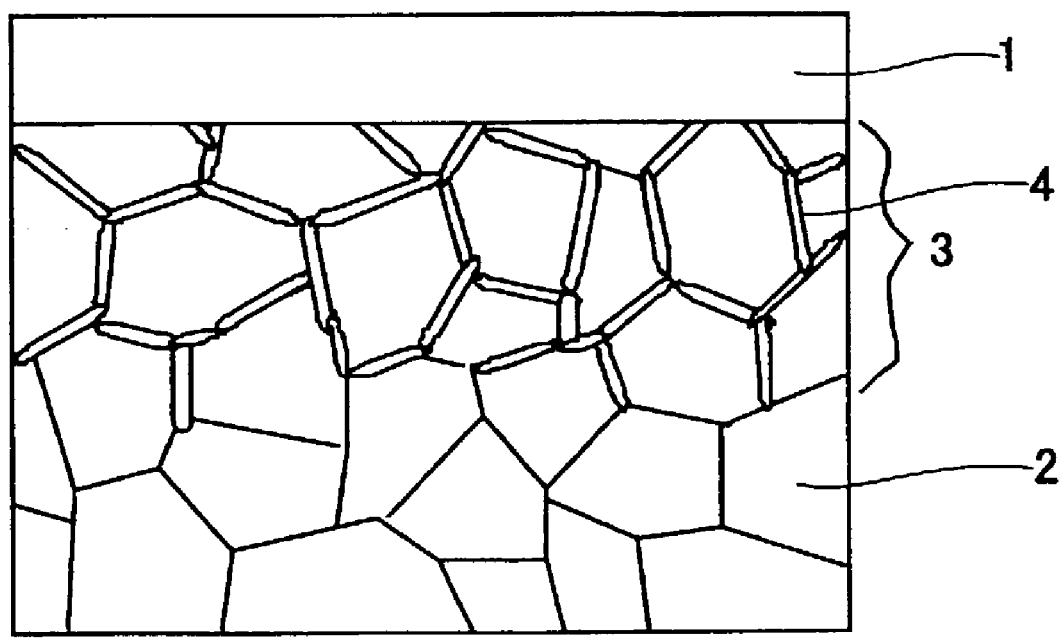
FIG. 4 is a fragmentary cross-sectional view of a base material with a conventional hard coating material.

FIG. 3 shows in perspective a movable vane made of austenitic stainless cast steel SCS16. In FIG. 3, a movable vane 13 has a vane tip including a region which is subject to a negative pressure. Such negative pressure region of the vane may possibly be damaged by cavitation erosion which is caused due to structural limitations under some operating conditions. A material of a portion 14 was removed by a depth of 2 mm with a grinder. The surface of the ground portion 14 was coated with a first layer having a thickness of 1.5 mm. The first layer was formed from a powder of a Ni—Cr—Mo alloy containing 30% Cr, 10% Mo, 1% Si by weight, and a remainder that consists of Ni and unavoidable impurities by a plasma transferred arc welding process. Then, a surface layer of the first layer was removed by a machining process to form the first layer having a thickness of 1 mm.

Thereafter, the surface of the first layer was coated with a second layer having a thickness of 1.5 mm. The second layer was formed from a powder of a hard material of a Co-base alloy (an alloy under the tradename of STELLITE 21 containing 26% Cr, 5.9% Mo, 3% Ni, 1.5% Fe, 1.1% Si, 0.25% C by weight, and a remainder that consists of Co) by a plasma transferred arc welding process. Then, a surface layer of the second layer was removed by a machining process to form the second layer having a thickness of 1 mm, thus producing a movable vane 13 having two coating layers on the portion 14.

In Example 2, austenitic stainless cast steel SCS16 was used as the base material. However, the present invention is not limited to any base materials and may use various base materials insofar as they can be used in seawater.

In Example 2, the first and second layers were deposited by the plasma transferred arc welding process. However, the first and second layers may be deposited by any processes insofar as they do not produce voids responsible for crevice corrosion in the boundary between the layer and the base material and within the layer. For example, it is possible to employ a self-fluxing alloy spraying process for thermal-spraying a powder of the layer material or coating a mixture of a powder of the layer material and an organic binder, and thereafter melting the layer material with heat. However, a plasma transferred arc welding process or a TIG welding process is preferable from the long-term reliability of the coated layers.

In Example 2, a Co-base alloy which is mainly composed of Co was used as the material of the second layer. However, the main constituent of the alloy for use as the material of the second layer is not limited to Co, but may be any of various materials that are corrosion-resistant in seawater. For example, the main constituent of the alloy for use as the material of the second layer may be Ni which has corrosion resistance equivalent to Co.

According to the present invention, parts for use in pumps can be produced using a hard coating according to the present invention, and such parts are highly resistant to wear due to earth and sand mixed with the handled liquid, and highly resistant to erosion and corrosion due to cavitations that occur under certain operating conditions. As a result, large-sized pumps including such parts for handing seawater containing earth and sand, and large-sized pumps for handing seawater and chemical substances which are operated under conditions of generating cavitation are kept highly reliable for operation over a long period of time.

Although a certain preferred embodiment of the present invention has been shown and described in detail, it should be understood that various changes and modifications may be made therein without departing from the scope of the appended claims.

What is claimed is:

1. A coating material on a vane in a pump comprising:
    a first layer adapted to be deposited on a base material, said first layer being made of a M—Cr—Mo alloy consisting of Cr, Mo, at least one of Si and B, M selected from the group consisting of Ni and Co, and carbon as an unavoidable impurity; and
    a second layer deposited on said first layer, said second layer being made of a hard material containing carbide and a metal component, said first layer serving as a barrier for preventing carbon from being diffused from said second layer into the base material to prevent the base material from being carburized wherein said second layer is made of a Co-base alloy or a Ni-base alloy which has a function for giving a hardness to said second layer by carbide which is contained in advance in the coating material or by carbide which is precipitated in said second layer when said second layer is deposited on said first layer.

2. A coating material on a vane in a pump according to claim 1, wherein said carbide gives a hardness to said second layer.

3. A coating material on a vane in a pump according to claim 1, wherein said metal component gives corrosion resistance to said second layer.

4. A coating material on a vane in a pump according to claim 1, wherein said M—Cr—Mo alloy prevents the base material from being carburized when said first layer is deposited on said base material.

5. The coating material on a vane in a pump as claimed in claim 1, wherein said second layer is the outermost or top layer of the coating material on a vane in a pump.

6. A pump vane, comprising:
    a base material of the pump vane coated with a coating material, said coating material comprising:
    a first layer adapted to be deposited on a base material, said first layer being made of a M—Cr—Mo alloy consisting of Cr, Mo, at least one of Si and B, M selected from the group consisting of Ni and Co, and carbon as an unavoidable impurity; and
    a second layer deposited on said first layer, said second layer being made of a hard material containing carbide and a metal component, said first layer serving as a baffler for preventing carbon from being diffused from said second layer into the base material to prevent the base material from being carburized,
    wherein said second layer is made of a Co-base alloy or a Ni-base alloy which has a function for giving a hardness to said second layer by carbide which is contained in advance in the coating material or by carbide which is precipitated in said second layer when said second layer is deposited on said first layer.

7. The pump vane as claimed in claim 6, wherein the second layer is the outermost or top layer of the pump vane.

* * * * *